L. S. CHADWICK.
PIPE SUPPORT.
APPLICATION FILED MAR. 30, 1914.

1,109,962.

Patented Sept. 8, 1914.

WITNESSES:
Robert L. Bruck
Hugh B. McGill

INVENTOR,
Lee S. Chadwick
By Hull and Smith
ATT'YS.

UNITED STATES PATENT OFFICE.

LEE S. CHADWICK, OF EAST CLEVELAND, OHIO.

PIPE-SUPPORT.

1,109,962.   Specification of Letters Patent.   Patented Sept. 8, 1914.

Original application filed October 25, 1913, Serial No. 797,217. Divided and this application filed March 30, 1914. Serial No. 828,422.

*To all whom it may concern:*

Be it known that I, LEE S. CHADWICK, a citizen of the United States, residing at East Cleveland, in the county of Cuyahoga and State of Ohio, have invented a certain new and useful Improvement in Pipe-Supports, of which the following is a full, clear, and exact description, reference being had to the accompanying drawings.

This invention relates to a pipe support of general utility, but which is especially well adapted for use in connection with that type of liquid fuel stoves shown in my former application No. 797,217, filed October 25, 1913, wherein the burners are carried entirely by the supply pipe; this present application being a division of said former application.

The object of this invention is the production of a pipe support which is comparatively simple of construction; which is very rigid; and whereby the pipe may be very securely held against turning.

Figure 1:
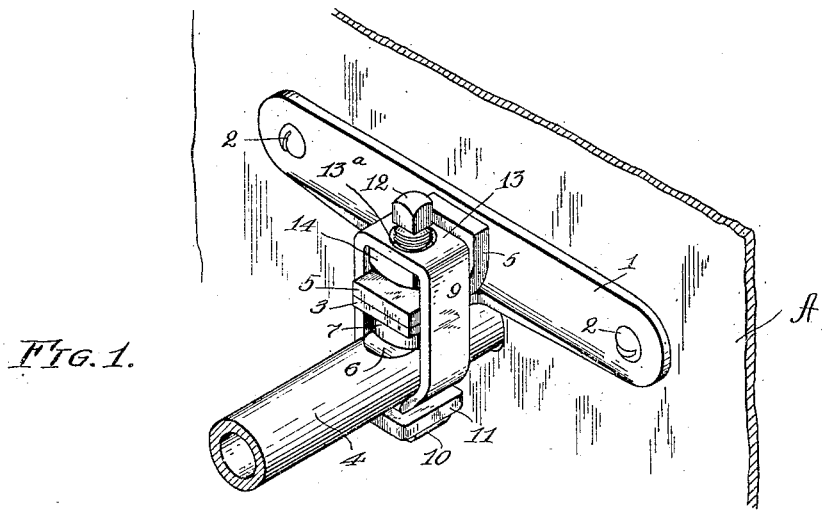
Figure 4:
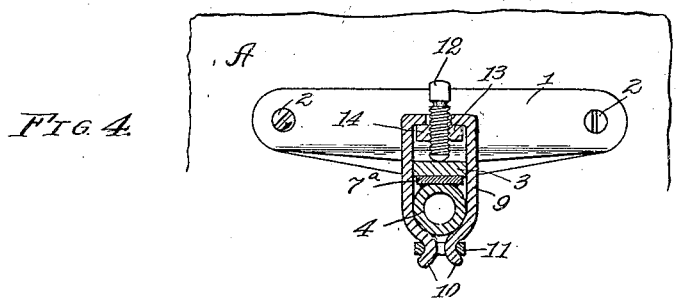
Figure 2:
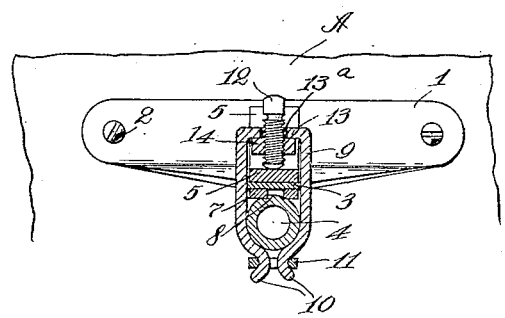
Figure 3:
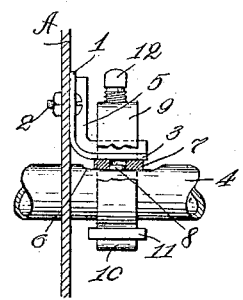

In the accompanying drawings, which form a part hereof, Figure 1 is a perspective of the pipe support applied to a sheet metal member and supporting a pipe which passes through said member; Fig. 2 is a transverse section through the pipe and support shown in Fig. 1, the plane of the section being parallel to the surface of the sheet metal member; Fig. 3 is a section through the sheet metal member at right angles to Fig. 2, a portion of the clamping means of the support being broken away to more clearly illustrate its construction; and Fig. 4 shows a simplified form of my pipe support.

The pipe support comprises a metal plate 1, which is adapted to be secured, by any suitable means (such as stove bolts 2), to a supporting structure which, in the present instance, is a sheet metal member A, it being obvious, of course, that the plate 1 might be fastened to any other form of supporting structure such, for instance, as a horizontal beam, or a pair of spaced vertical members which might be bridged by the plate 1. It will be observed that the plate 1 is of considerable lateral extent and that it has a projection 3 extending from its lower edge horizontally over the pipe 4. As shown, this projection is reinforced by a substantial angle iron 5 which is soldered or otherwise secured in the corner between the projection 3 and the body portion of the plate 1; but where a comparatively heavy quality of stock is used for the plate 1, the angle iron may be omitted.

Directly beneath the projection 3, the pipe 4 is flattened at 6 for the application of a washer 7, a small nib 8 being left at the center of such flattened portion to project into the hole of the washer.

To securely bind the pipe, the washer 7 and the projection 3, with its reinforcing angle 5, together, I employ a clam comprising a metal strip 9, which is bent into U-shape and inverted over the parts mentioned, with its outwardly turned lower ends 10 held together by a clip or ring 11. A set screw 12 passes freely through an opening 13ª in the central, horizontal portion 13 of the strap 9, and is threaded through a square nut 14 that is confined between the side branches of the U-shaped strap and is located beneath and bears against the portion 13 thereof. The end of the set screw 12 contacts with the upper surface of the horizontal branch of the angle iron 5. By turning the screw 12 in the appropriate direction, the nut 14 (which is locked against rotation by the sides of the U-shaped strap) will be fed upwardly on the screw, and the strap 9 placed under tension; it being remembered that the lower ends of the strap are held securely together beneath the pipe 4.

While I have specified that a nib 8 is left at the center of the flattened portion 6 of the pipe 4, and that a washer 7 is applied thereto, it will be understood that practically the same effect may be secured by omitting the nib 8 and using, in place of the washer 7, a flat disk 7ª which is soldered or otherwise secured to the flattened portion of the pipe. Fig. 4 shows this modification of my invention, and also shows the plate 1 made of sufficiently heavy material to render unnecessary, the use of the reinforcing angle iron 5.

From the foregoing description it will be seen that my invention provides a very rigid pipe support whereby a pipe may be securely held against turning, the coöperation of the flattened portion of the pipe and the projection of the plate 1 acting as a lock to hold the pipe against any possible angular movement with respect to the pipe support.

Having thus described my invention, what I claim is—

1. In a pipe support, the combination with a pipe having a flattened portion, of a member that is secured to such flattened portion, a supporting plate having a lateral projection extending over said member, and a device for clamping the pipe, the member and the projection together.

2. In a pipe support, the combination with a pipe having a flattened portion, of a member upon said flattened portion, a supporting plate having a lateral projection extending over said member, an L-shaped reinforcing member fitted within the angle between the body portion of the supporting plate and the aforesaid projection, and a device for clamping the pipe, the first mentioned member, and the projection with its reinforcing member together.

3. In a pipe support, the combination with a pipe having a flattened portion, of a supporting plate having a lateral projection extending over such flattened portion of the pipe, an L-shaped reinforcing member fitted within the angle between the body portion of the supporting plate and the aforesaid projection, and a clamping device for securing the pipe and the projection with its reinforcing member together.

4. In a pipe support, the combination with a pipe having a flattened portion, of a member upon said flattened portion, a supporting plate having a lateral projection extending over said member, and a clamping device for holding the pipe, the member and the projection together, said device comprising an inverted, substantially U-shaped strap having a flat central portion extending in a plane parallel to the plane of the aforesaid projection, and means interposed between and tending to force apart the flat central portion of the aforesaid strap and the lateral projection of the above mentioned plate, the free ends of the aforesaid strap being secured together on the side of the pipe opposite its flattened portion.

5. In a pipe support, the combination, with a pipe having a flattened portion, of a member upon said flattened portion, a supporting plate having a lateral projection extending over said member, and a clamping device for holding the flattened portion of the pipe against the projection, said device comprising an inverted, substantially U-shaped strap having a flat central portion extending in a plane parallel to the plane of the aforesaid projection, a set screw extending therethrough and bearing against the projection, and a nut threaded upon the screw and bearing against the underneath surface of the flat portion of the strap, the free ends of the aforesaid strap being secured together on the side of the pipe opposite its flattened portion.

6. In a pipe support, the combination with a pipe having a flattened, annular portion, of a washer upon said flattened portion, a supporting plate having a lateral projection extending over said washer, an L-shaped reinforcing member fitted within the angle between the body portion of the supporting plate and the aforesaid projection, and a clamping device for holding the pipe, the washer and the projection with its reinforcing member together, said device comprising an inverted, substantially U-shaped strap having a flat central portion extending in a plane parallel to the plane of the aforesaid projection, said flattened portion having an opening, a set screw passing freely through said opening and bearing against the reinforcing member of the aforesaid projection, and a nut which is threaded upon the screw and which is confined between the sides of the U-shaped strap and bears against that portion of the strap that surrounds the aforesaid opening, the free ends of the aforesaid strap being secured together on the sides of the pipe opposite its flattened portion.

In testimony whereof, I hereunto affix my signature in the presence of two witnesses.

LEE S. CHADWICK.

Witnesses:
BRENNAN B. WEST,
HUGH B. McGILL.